(12) United States Patent
Massie

(10) Patent No.: US 7,962,966 B2
(45) Date of Patent: Jun. 14, 2011

(54) SCANNING PROBE MICROSCOPE HAVING IMPROVED OPTICAL ACCESS

(75) Inventor: James Robert Massie, Santa Barbara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 196 days.

(21) Appl. No.: 12/471,762

(22) Filed: May 26, 2009

(65) Prior Publication Data

US 2010/0306884 A1    Dec. 2, 2010

(51) Int. Cl.
*G01N 13/16* (2006.01)
*G01B 5/28* (2006.01)

(52) U.S. Cl. ....... 850/6; 850/1; 850/8; 850/33; 250/234; 250/216; 73/105

(58) Field of Classification Search .................. 850/6, 8, 850/1, 33; 250/234, 216; 73/105
See application file for complete search history.

(56) References Cited

U.S. PATENT DOCUMENTS

| 6,339,217 B1 * | 1/2002 | Kley | 250/216 |
| 7,091,476 B2 * | 8/2006 | Kley | 250/234 |
| 7,615,738 B2 * | 11/2009 | Kley | 250/234 |
| 2002/0092340 A1 * | 7/2002 | Prater et al. | 73/24.02 |
| 2010/0269232 A1 * | 10/2010 | Workman | 850/33 |

* cited by examiner

*Primary Examiner* — Nikita Wells

(57) ABSTRACT

A scanning probe microscope and method for using the same are disclosed. The Scanning probe microscope includes a probe mount for connecting a cantilever arm and a probe signal generator. The probe position signal generator generates a position signal indicative of a position of the probe relative to one end of the cantilever arm. The probe position signal generator includes a first light source that directs a light beam at a first reflector positioned on the cantilever arm and a detector that detects a position of the light beam after the light beam has been reflected from the first reflector. A second reflector reflects the light beam after the light beam is reflected from the first reflector and before the light beam enters the detector, the second reflector passing light from a second light source that illuminates the sample.

17 Claims, 5 Drawing Sheets

SCANNING PROBE MICROSCOPE HAVING IMPROVED OPTICAL ACCESS

BACKGROUND OF THE INVENTION

Scanning probe microscopes use any of a class of imaging techniques in which a tip that interacts locally with a sample is scanned over the surface of the sample to generate a three-dimensional image representing a property of the surface at different points on the surface of the sample. For example, in atomic force microscopy, the surface interaction force between the probe tip and the sample is measured at each point on the sample. The tip has a very small end and is mounted on one end of a cantilever arm. The other end of the cantilever arm is attached to a cantilever arm mounting structure. The height of this structure relative to the sample can be altered either by moving the structure or by moving the sample depending on the particular microscope design.

As the tip is moved over the surface of the sample, the arm deflects in response to the changes in topology of the surface. The deflection of the arm is measured and used to control an actuator that sets the distance between the cantilevered arm mounting structure and the sample. Images are typically acquired in one of two modes. In the contact or constant force mode, the tip is brought into contact with the sample and the tip moves up and down as the tip is moved over the surface. The deflection of the cantilever arm is a direct measure of force and topographical variations. A feedback controller measures the deflection and adjusts the height of the cantilever arm mounting structure so as to maintain a constant force between the cantilevered probe and the surface, i.e., the arm at a fixed deflection. The height of the cantilever arm's fixed end as a function of the lateral position on the sample is used to construct the final image of the sample's surface.

The applications of the contact mode are limited due to a strong shear force developed whilst the tip is moved over the sample surface while staying in constant contact with the sample surface. These shear forces can damage soft samples. The sample damage can be substantially reduced by operating the microscope in the second mode, referred to as the AC mode.

In the AC, or non-contact mode, the tip and arm are oscillated at a frequency near the resonant frequency of the arm. The height of the tip is controlled such that the tip either avoids contact with the surface or makes only a light intermediate contact over part of the oscillation cycle. In this mode, the tip samples short-range tip/sample forces. The short range forces between the tip and the sample result in changes in the oscillations of the tip. A detector measures a property that is related to the tip position and generates a signal that is likewise related to the position of the tip. This signal will be referred to as the tip position signal in the following discussion. For example, the position of a spot of light on an imaging detector that results from a light beam that is reflected from a mirrored surface on the cantilever arm is used in some scanning probe microscopes to provide the tip position signal.

The controller adjusts the height of the cantilever arm over the sample such that the oscillation amplitude, phase and/or frequency of the tip position signal is kept at a predetermined constant value. Since the tip is not in constant contact with the sample, the shear forces applied to the sample are significantly less than in the mode in which the tip is in constant contact. For soft samples, this AC mode reduces the damage that the tip can inflict on the sample and also provides a more accurate image of the surface in its non-disturbed configuration. This mode is particularly attractive when imaging biological samples.

It should be noted that the image could be constructed using some other parameter beside the height of the cantilever arm as a function of position on the sample when the cantilever arm is positioned to maintain a property of the tip position signal constant. For example, the image can be formed by measuring the amplitude of a harmonic of the tip position signal while the cantilever arm is maintained at a height that maintains the amplitude of the fundamental frequency of the tip position signal constant.

The image is constructed one point at a time and is limited by the rate at which the tip can be moved relative to the sample, as well as by the time required for the servo loop to reposition the tip vertically to maintain the distance between the surface and the tip. The feedback control system that is used to position the cantilevered arm vertically over the sample must extract the needed information from the oscillatory signal provided by the system that tracks the position of the tip as a function of time. The time to extract the information is long compared to the period of the tip position signal. Hence, each point in the image represents an average of a property of the tip position signal over a relatively long period of time.

Accordingly, the time to generate a single image can be several minutes. The scanning time can be reduced if the scan is limited to a small area that contains the structure of interest. In many cases, an optical microscope can, in principle, be used to find the structure of interest and position the probe tip in the region of interest. However, for this strategy to be useful, the structure of interest must be viewable in a light microscope. Many structures have dimensions that are at the limit of the sizes that can be viewed optically, and hence, the microscope must have an objective with a high numerical aperture. Accommodating a microscope with a high numerical aperture and good optical image quality together with an appropriate illumination source within the structure of a scanning probe microscope presents problems.

SUMMARY OF THE INVENTION

The present invention includes a scanning probe microscope and method for using the same. The Scanning probe microscope includes a probe mount and a probe signal generator. The probe mount is adapted to receive a probe having a tip that moves in response to an interaction between the tip and a local characteristic of a sample. The probe tip is mounted on a first end of a cantilever arm, a second end of the cantilever arm being coupled to the probe mount. The probe position signal generator generates a position signal indicative of a position of the probe relative to the second end of the cantilever arm. The probe position signal generator includes a first light source that directs a light beam at a first reflector positioned on the cantilever arm and a detector that detects a position of the light beam after the light beam has been reflected from the first reflector. The scanning probe microscope also includes a second reflector that reflects the light beam after the light beam is reflected from the first reflector and before the light beam enters the detector, the second reflector passing light from a second light source that illuminates the sample.

In one aspect of the invention, the light beam is characterized by a position sensing wavelength and wherein the second reflector includes a dichroic reflector that reflects light of the position sensing wavelength while passing light from the second light source. In another aspect of the invention, the light beam is characterized by a first polarization, and the second reflector reflects light of the first polarization while passing light of an orthogonal polarization, the second light source generating light includes light of the orthogonal polarization. In yet another aspect of the invention, the second reflector includes a partially reflecting surface.

In another aspect of the invention, the scanning probe microscope includes an optical microscope that forms an image of the sample utilizing light from the second light source. The optical microscope could include an illuminator positioned on one side of the sample and an objective lens positioned on the other side of the sample, the illuminator including the second light source.

In another aspect of the invention, the scanning probe microscope includes a stage on which the sample is moved relative to the probe mount. The stage includes a transparent section positioned to allow an optical imaging system to view the sample.

DETAILED DESCRIPTION OF PREFERRED EMBODIMENTS OF THE INVENTION

Figure 1:
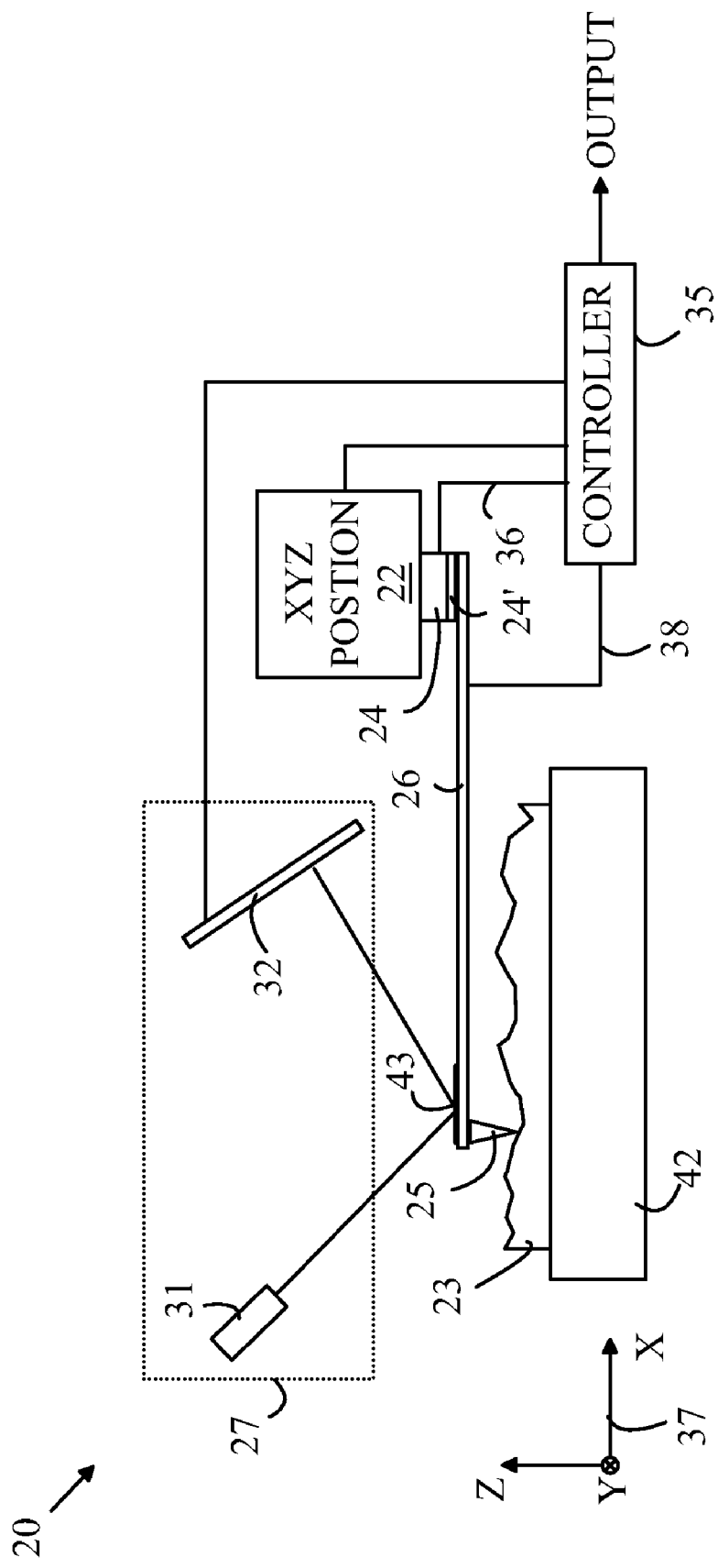
FIG. 1 illustrates one embodiment of a prior art atomic force microscope.

The manner in which the present invention provides its advantages can be more easily understood with reference to FIG. 1, which illustrates one prior art embodiment of an atomic force microscope. Microscope 20 includes a probe assembly and a stage 42 on which a sample 23 to be imaged is mounted. The probe assembly includes a tip 25 that is mounted on a cantilever arm 26 that deflects in response to forces on probe tip 25. The degree of deflection of cantilever arm 26 is measured by a detector 27. In the embodiment shown in FIG. 1, the detector 27 includes a light source 31 and a photodetector 32. Light source 31 illuminates a reflector 43 on cantilever arm 26, and the location of the reflected light is detected by photodetector 32 that provides a tip position signal that is related to the degree of deflection of cantilever arm 26. The reflector can be implemented as a reflective coating on cantilever arm 26, a separate reflector, or the natural reflectivity associated with the cantilever arm.

One end of cantilever arm 26 is attached to an electro-mechanical actuator such as piezoelectric actuator 22 that can move that end in three dimensions, denoted by X, Y, and Z as shown at 37. An AC actuator 24 that vibrates the fixed end of cantilever arm 26 is disposed between actuator 22 and cantilever arm 26 and receives a signal over line 36 that controls the amplitude of the vibrations. The fixed end of the cantilever arm can be attached to AC actuator 24 by a probe mount 24'. AC actuator 24 can be constructed from lead zirconate titanate (PZT) that is driven by an AC drive signal at a frequency $\omega_0$ by controller 35. Here, $\omega_0$ is chosen to be a frequency that is substantially equal to one of the resonant frequencies of cantilever arm 26. The signal from photodetector 32 includes an AC component at $\omega_0$ that is the result of this induced vibration. This signal will be referred to as the tip position signal in the following discussion. The amplitude and phase of the tip position signal and its harmonics depend on the interaction between probe tip 25 and sample 23 in the vicinity of probe tip 25, and hence, the amplitude of this signal depends on the distance between tip 25 and the sample. Controller 35 controls the Z-coordinate of the cantilever through actuator 22 to maintain a parameter related to the tip position signal at a predetermined value while the X and Y coordinates of the probe tip are varied to provide an image of the sample surface, e.g., the height of the cantilever end as a function of X and Y. It should be noted that an image could also be formed utilizing the amplitude or the phase of the tip position signal at $\omega_0$ or at any of the higher harmonics of this frequency as a function of X and Y. In some modes of operation, signals are coupled directly to probe tip 25 and/or cantilever arm 26 via a connection 38 based on measurements of the probe position signal. These signals can also be used in generating images.

It should be noted that the arrangement shown in FIG. 1 is only one of many possible electro-mechanical configurations. In one class of microscopes, the probe tip is scanned in 3 axes. In another class of microscopes, the sample is scanned in 3 axes while the base of the cantilever arm remains stationary. In yet another class of microscopes, the sample is scanned in some axes and the cantilever arm in others. Accordingly, the arrangement shown in FIG. 1 is for illustrative purposes. However, the present invention applies equally well to all embodiments/designs.

Figure 3:
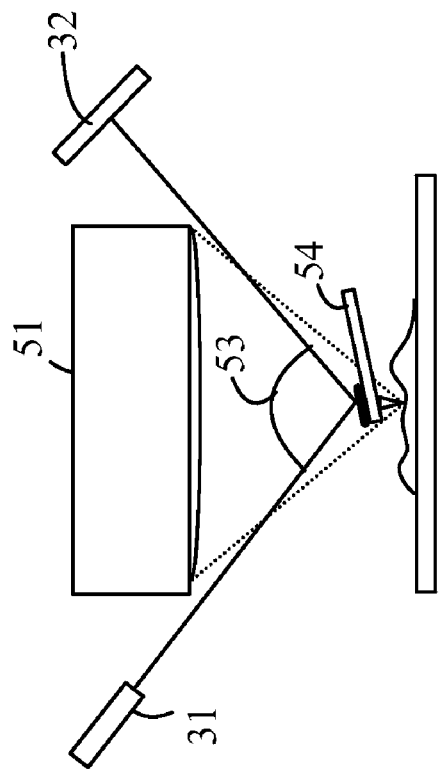
FIGS. 2 and 3 are simplified views of a prior art scanning probe microscope having a microscope mounted above the cantilever arm.
Figure 2:
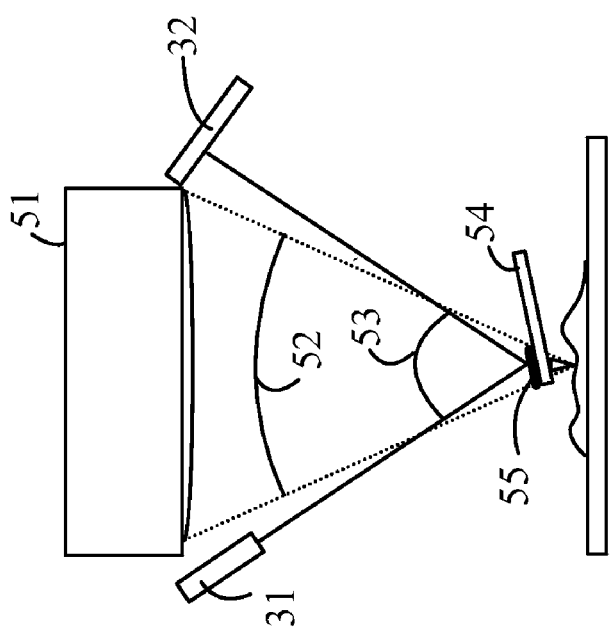

As noted above, an optical microscope may be used within a scanning probe microscope system to optimize the scanning region on the sample and to provide a visual image of the region of the specimen that is being scanned. Careful choice of the region to be scanned reduces the total area that must be scanned to provide an image of the structure of interest, and hence, reduces the time needed to scan the region of interest. Refer now to FIGS. 2 and 3, which illustrate the problems associated with combining an optical microscope with a scanning probe microscope. FIGS. 2 and 3 are simplified views of prior art scanning probe microscope optical systems in a scanning probe microscope having a microscope mounted above the cantilever arm.

Refer now to FIG. 2, which illustrates a microscope that includes an objective or illuminator lens 51 that collects the light that is used to generate the optical image. To simplify the drawings, only objective or illuminator lens 51 is shown in the drawings and represents the microscope for purposes of this discussion. This is the structure that interferes with the operation of the cantilever arm position sensing mechanism. However, it is to be understood that that the microscope includes a number of lenses and other structures. A more detailed discussion of the other structural arrangements will be provided below.

Many of the structures of interest require a high-resolution optical microscope to position the scanning probe microscope at or near the structure of interest. The scanning probe microscope, which has a resolution much greater than the optical microscope can then be used to scan the structure of interest without wasting time scanning a much larger area that includes the structure of interest and areas of little interest. A high-resolution optical microscope requires the objective to have a high numerical aperture. The numerical aperture can be represented by the angle 52 that lens 51 subtends at the point on the sample being imaged. The higher the numerical aperture, the greater the value of angle 52. Good optical image resolution at the magnifications inherent in many scanning probe microscopes requires angle 52 to be of the order of 60 degrees or more.

The area over the cantilever arm 54 must also accommodate the optics needed for measuring the vertical position of the end of the cantilever arm that has the tip attached thereto. The tip position optics typically include a light source 31, which is typically a laser, and a detector 32, which is typically a photodetector array. A beam of light from light source 31 is focused onto mirrored surface 55 on cantilever arm 54 and is reflected from the mirrored surface on the top of cantilever arm 54 into detector 32. As the cantilever arm flexes, the position of the reflected spot on photodetector array in detector 32 moves. As will be explained in more detail below, there are constraints on the positioning of source 31 relative to mirror 55 that constrain the allowed values of angle 53.

Refer now to FIG. 3. One method for increasing the numerical aperture of lens 51 is to move lens 51 closer to the sample. However, there is a limit to the improvement that can be obtained by this technique, since eventually, lens 51 or the mechanical structure associated with that lens will be positioned such that lens 51 blocks the optical paths used by the tip position measuring system. In principle, angle 53 can be increased to accommodate lens 51 at a position that is closer to cantilever arm 54 as shown in FIG. 3. However, the constraints on the positioning of light source 31 and detector 32 do not allow for such a repositioning of these components without negatively impacting the accuracy and functioning of the scanning probe microscope.

Figure 4:
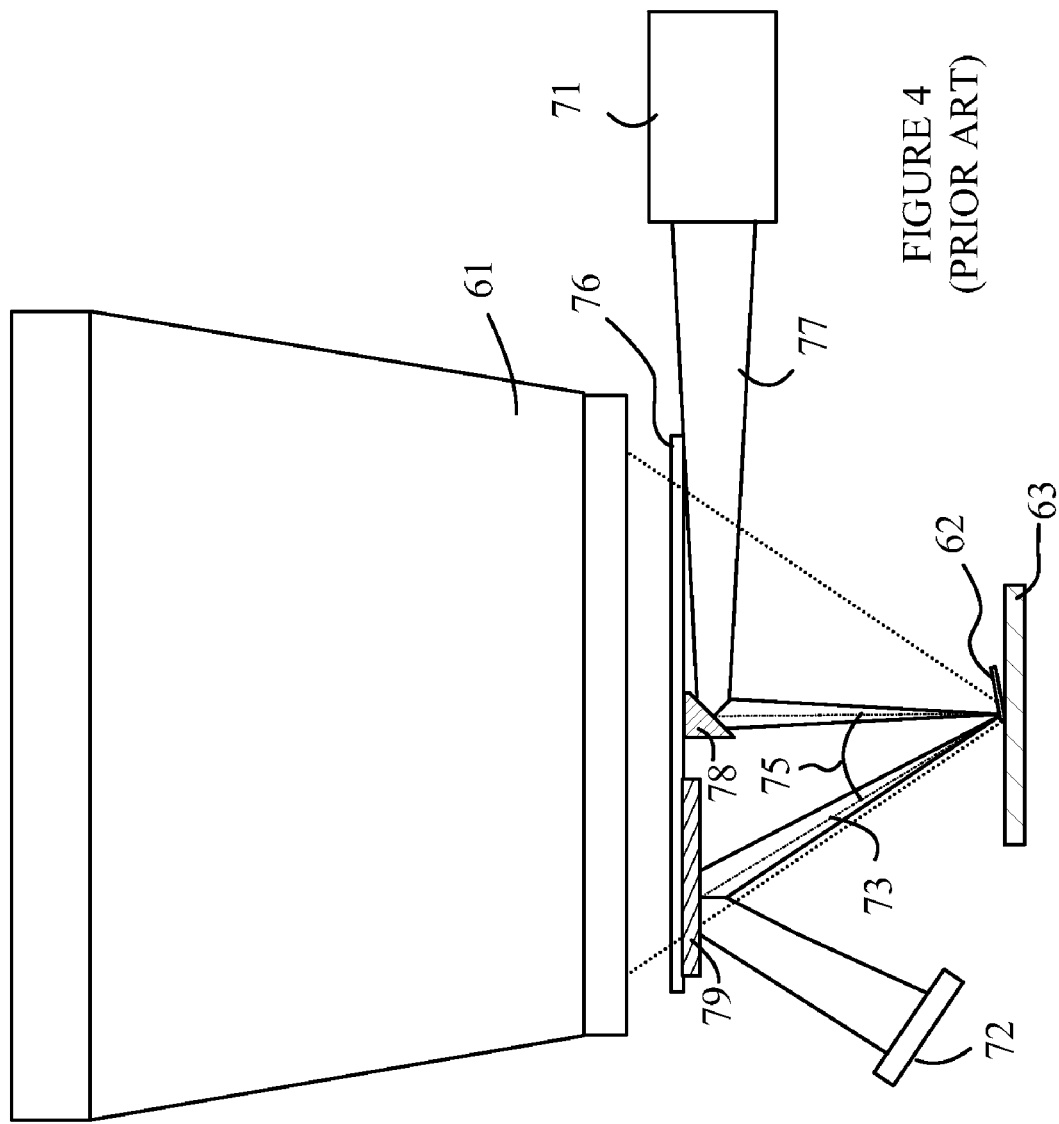
FIG. 4 is cross-sectional view of a prior art scanning probe microscope cantilever having a folded optical path.

One prior art approach that avoids the problems inherent in altering the placement of light source 31 and detector 32 relative to cantilever arm 54 utilizes an arrangement in which the optics utilized by the probe position detection system are folded in a manner that allows those optics to be placed below the microscope objective lens. Refer now to FIG. 4, which is a prior art cross-sectional view of a scanning probe microscope 60 that utilizes such a folded optical arrangement. Scanning probe microscope 60 utilizes a microscope having an illuminator lens 61 that illuminates a sample on stage 63. In this case, the microscope views the sample from below through a transparent stage 63. The scanning probe microscope utilizes a cantilever arm 62, a light source 71, and a detector 72. To simplify the drawing, the mechanical structures connected to cantilever arm 62 have been omitted from the drawing. Cantilever arm 62 moves up and down relative to the surface of stage 63 in the z-direction under the control of the servo system discussed above. In this particular prior art embodiment mirrors 78 and 79 are supported by a thin metal support structure shown at 76 that only partially obstructs the light from illuminator lens 61.

For the purposes of this discussion, it is important to note that the incident light beam provided by light source 71 is focused to a point on, or near, the mirrored surface on cantilever arm 62 and that cantilever arm 62 is inclined at a slight angle relative to the surface of stage 63, typically 10-12 degrees. In addition, cantilever arm 62 can be located in a different environment depending on the nature of the sample being scanned. In particular, cantilever arm 62 could be surrounded by a liquid or surrounded by a gas. The nature of the environment can alter the optical path of the light beams used by the probe position detection system. To assure that the incident beam 77 strikes the mirrored surface on cantilever arm 62 independent of the z-position of cantilever arm 62 and independent of the local environment in which cantilever arm 62 is immersed, the incident beam is directed at cantilever arm 62 from a direction that is parallel to the z-axis as shown in the figure. This assures that any changes in environment or z-position of the cantilever arm do not result in the beam missing the mirrored surface. Such variations lead to variations in angle 75 between the incident and reflected beams. A mirror 78 directs beam 77 such that beam 77 is aligned with the z-axis when beam 77 strikes cantilever arm 62. The reflected beam 73 generated by the reflection of incident beam 77 by the reflector on the cantilever arm is redirected to detector 72 by mirror 79. In addition, utilizing an incident beam that is parallel to the z-axis assures that the cantilever arm reflector does not move out from under the incident beam when the cantilever is displaced along the z-axis by the z-axis position controller that is part of piezoelectric actuator 22 shown in FIG. 1.

While this arrangement reduces the problems associated with accommodating lens 61 at a location that is close to the sample to improve the numerical aperture of the optical imaging system, mirror 79 presents other problems that degrade the optical image. Mirrors 78 and 79 are out of the focal plane of lens 61, and hence, are not visible in the optical image or do not obscure a significant portion of the illumination in the case of an illuminator. However, if these mirrors are large compared to the aperture of lens 61, the mirrors will cause a substantial degradation in the optical image and reduce the available light for the optical imaging operation. Mirror 78 does not present a substantial problem in this regard, since it only needs to be large enough to reflect incident beam 77, which has a fixed geometry independent of the z-position or angle of cantilever arm 62.

In contrast, mirror 79 must be large enough to accommodate variations in location of beam 73. These variations result from differences in the cantilever environment and variations in the initial cantilever bend angle. Additionally, the location of beam 73 changes significantly if the cantilever is operating in water as opposed to air. In addition, as noted above, there can be variations in initial cantilever bend angles due to internal stresses within the cantilevers. The initial angle could vary as much as ±3 degrees from cantilever to cantilever. In addition, temperature or other environmental factors could induce additional variations in the initial angle. Hence, a larger mirror is required to accommodate these variations. The larger mirror obscures a more significant portion of the optical path used by the illuminator or objective.

The present invention is based on the observation that mirror 79 shown in FIG. 4 can be replaced by a large semi-transparent reflector that reflects light from light source 71 while allowing light required for the optical image to pass through the reflector. One embodiment of the present invention is based on the observation that the light from light source 71 can be essentially a monochromatic beam while the illumination system used by the optical microscope provides a broad spectrum. As a result, mirror 79 can be replaced by a dichroic reflector that reflects light of the wavelength utilized by the tip position detection system without blocking the light used by the optical microscope to illuminate the sample and form the optical image.

Figure 5:
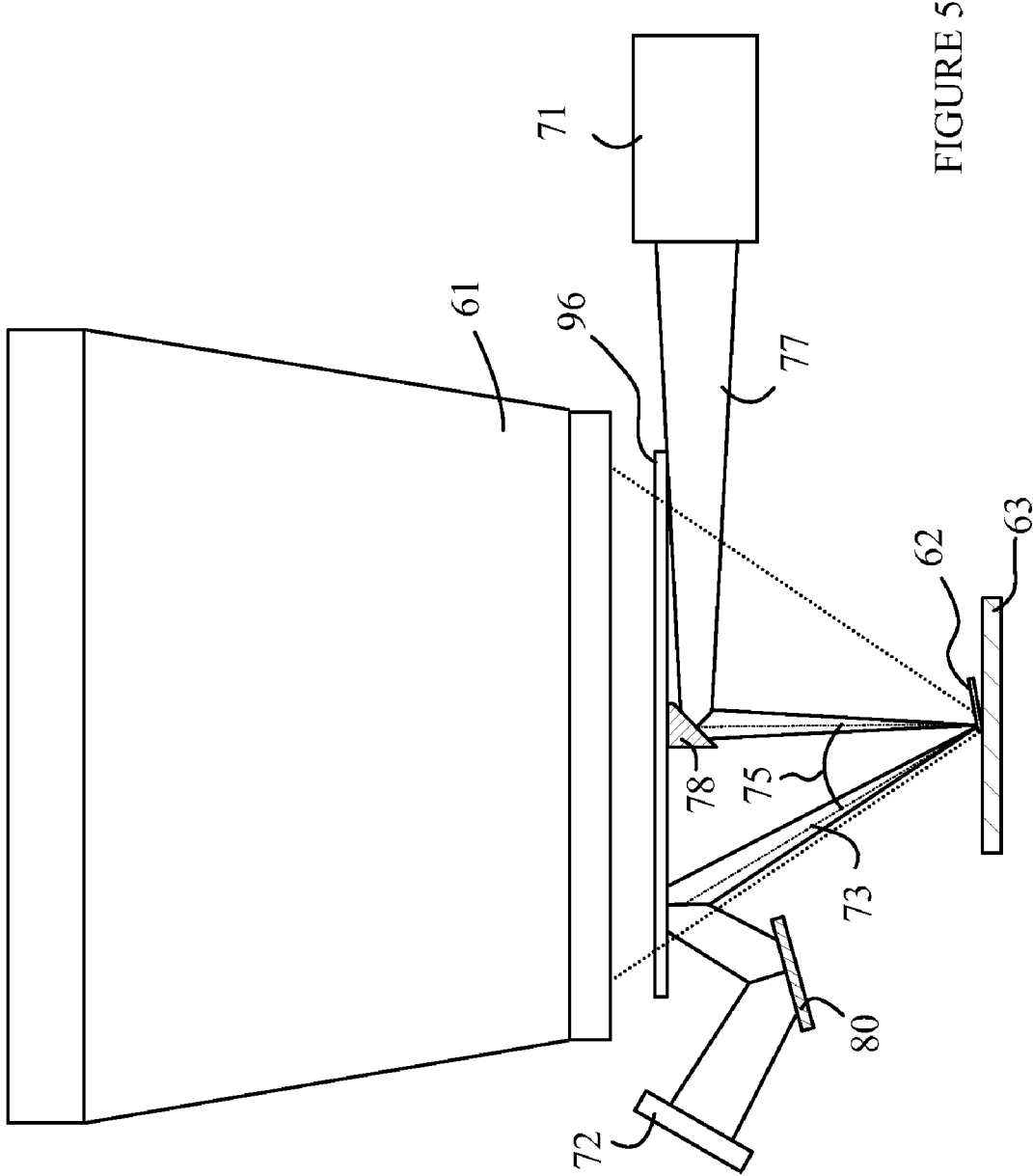
FIG. 5 is a cross-sectional view through an embodiment of a scanning probe microscope according to the present invention.

Refer now FIG. 5, which is a cross-sectional view through a scanning probe microscope 90 according to one embodiment of the present invention. Scanning probe microscope 90 utilizes a dichroic reflector 96 that reflects light of the wavelength generated by light source 71 while transmitting light in the band of wavelengths used by the optical imaging system. The reflected light beam is then redirected into detector 72 by mirror 80. Hence, dichroic reflector 96 provides a large area "mirror" that does not substantially interfere with the operation of the optical microscope. Since light source 71 is typically a laser, the dichroic reflector need only reflect a small band of wavelengths, and hence, any light lost by the reflection of this band of wavelengths does not significantly alter the optical imaging system resolution. Furthermore, the probe detection system can utilize wavelengths that are not in the optical spectrum of interest required by the optical microscope system, and hence, any loss of light or interference between the two spectra can be minimized.

The above-described embodiments utilize a dichroic reflector to fold the path of the light beams that measure the orientation of the cantilever arm. However, other forms of reflector could be utilized. For example, the light beam from light source 71 could be polarized. In this case, the reflector would be a polarization dependent reflector while the light utilized by the optical microscope would include light of the orthogonal polarization.

Figure 6:
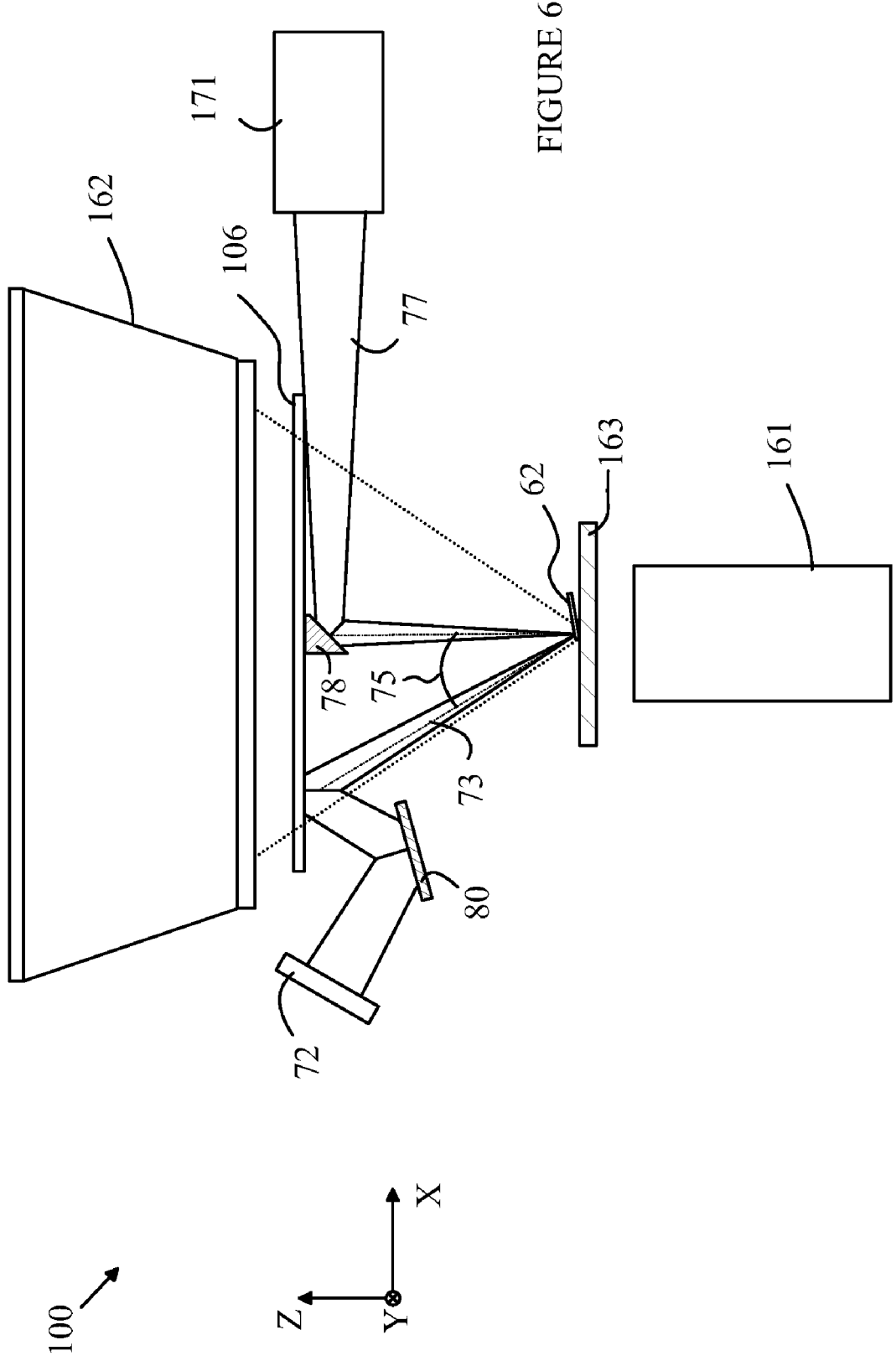
FIG. 6 is a cross-sectional view of another embodiment of a scanning probe microscope according to the present invention.

Refer now to FIG. 6, which illustrates another embodiment of a scanning probe microscope according to the present invention. Scanning probe microscope 100 utilizes an arrangement in which an illuminator 162 is positioned above the cantilever arm, and an optical microscope 161 is positioned below the sample. In this arrangement, sample carriage 163 is transparent in the region below the sample. Scanning probe microscope 100 utilizes a reflector 106 that reflects light of a first polarization while transmitting light of the orthogonal polarization. Light source 171 generates a light beam that includes light of the first polarization. It should be noted that light source 171 could generate light having both polarizations. In this case, the light of the orthogonal polarization would pass through reflector 106 and be lost; however, scanning probe microscope 100 would still function properly.

The light from illuminator 162 includes light of the orthogonal polarization, and hence, passes through reflector 106. It should be noted that illuminator 106 could generate light of both polarizations. In this case, the light reaching the sample would be polarized with the second polarization. Microscopes that utilize a polarization dependent illumination system and detection system are advantageous in certain applications, and hence, this arrangement provides an additional benefit in those applications.

Embodiments in which reflector 106 is a partially reflecting surface that does not have a polarization dependence could also be constructed. For example, reflector 106 could be a half silvered mirror. In this case half of the light from illuminator 162 would be lost. Similarly, half of the light reflected from cantilever arm 62 would be lost. However, such embodiments would function adequately in many applications.

The above-described embodiments of the present invention utilize a laser as the light source 31. However, embodiments in which other light sources are utilized could also be constructed.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A scanning probe microscope comprising:
   a probe mount adapted to receive a probe having a tip that moves in response to an interaction between said tip and a local characteristic of a sample, said probe tip being mounted on a first end of a cantilever arm, a second end of said cantilever arm being coupled to said probe mount;
   a probe position signal generator that generates a position signal indicative of a position of said probe relative to said second end of said cantilever arm, said probe position signal generator comprising a first light source that directs a light beam at a first reflector positioned on said cantilever arm and a detector that detects a position of said light beam after said light beam has been reflected from said first reflector; and
   a second reflector that reflects said light beam after said light beam is reflected from said first reflector and before said light beam enters said detector, said second reflector passing light from a second light source that illuminates said sample.

2. The scanning probe microscope of claim 1 wherein said light beam is characterized by a position sensing wavelength and wherein said second reflector comprises a dichroic reflector that reflects light of said position sensing wavelength while passing light from said second light source.

3. The scanning probe microscope of claim 1 wherein said light beam is characterized by a first polarization and wherein said second reflector reflects light of said first polarization while passing light of an orthogonal polarization, said second light source generating light comprising light of said orthogonal polarization.

4. The scanning probe microscope of claim 1 wherein said second reflector comprises a partially reflecting surface.

5. The scanning probe microscope of claim 1 further comprising an optical microscope that forms an image of said sample utilizing light from said second light source.

6. The scanning probe microscope of claim 5 wherein said optical microscope comprises an illuminator positioned on one side of said sample and an objective lens positioned on the other side of said sample, said illuminator comprising said second light source.

7. The scanning probe microscope of claim 1 further comprising a stage on which said sample is moved relative to said probe mount, said stage comprising a transparent section positioned to allow an optical imaging system to view said sample.

8. The scanning probe microscope of claim 1 wherein said light source comprises a laser.

9. The scanning probe microscope of claim 1 wherein said light source focuses said light beam to a point that is proximate to said cantilever arm reflector.

10. A method for forming an image of a sample, said method comprising:
   providing a scanning probe microscope comprising:
   a probe mount adapted to receive a probe having a tip that moves in response to an interaction between said tip and a local characteristic of a sample, said probe tip being mounted on a first end of a cantilever arm, a second end of said cantilever arm being coupled to said probe mount; and
   a probe position signal generator that generates a position signal indicative of a position of said probe relative to said second end of said cantilever arm, said probe position signal generator comprising a first light source that directs a light beam at a first reflector positioned on said cantilever arm and a detector that detects a position of said light beam after said light beam has been reflected from said first reflector;
   providing a second light source that illuminates said sample; and positioning a second reflector that reflects said light beam after said light beam is reflected from said first reflector and before said light beam enters said detector, said second reflector passing light from said second light source.

11. The method of claim 10 wherein said light beam is characterized by a position sensing wavelength and wherein said second reflector comprises a dichroic reflector that reflects light of said position sensing wavelength while passing light from said second light source.

12. The method of claim 10 wherein said light beam is characterized by a first polarization and wherein said second reflector reflects light of said first polarization while passing light of an orthogonal polarization, said second light source generating light comprising light of said orthogonal polarization.

13. The method of claim 10 wherein said second reflector comprises a partially reflecting surface.

14. The method of claim 10 further comprising forming an image of said sample with an optical microscope utilizing light from said second light source.

15. The method of claim 14 wherein said second light source is on one side of said sample and said optical microscope is on the other side of said sample.

16. The method of claim 10 further comprising providing a stage on which said sample is moved relative to said probe mount, said stage comprising a transparent section positioned to allow said optical microscope to view said sample.

17. The method of claim 10 wherein said light beam is focused to a point that is proximate to said cantilever arm reflector.

* * * * *